US011382202B2

United States Patent
Yang et al.

(10) Patent No.: US 11,382,202 B2
(45) Date of Patent: Jul. 5, 2022

(54) METHOD AND APPARATUS FOR CONTROLLING A LIGHTING FIXTURE BASED ON MOTION DETECTION AND RELATED LIGHTING FIXTURE

(71) Applicant: Himax Imaging Limited, Tainan (TW)

(72) Inventors: Wei-Chieh Yang, Tainan (TW); Po-Chang Chen, Tainan (TW); Yuan-Chih Peng, Tainan (TW)

(73) Assignee: Himax Imaging Limited, Tainan (TW)

( * ) Notice: Subject to any disclaimer, the term of this patent is extended or adjusted under 35 U.S.C. 154(b) by 13 days.

(21) Appl. No.: 17/005,291

(22) Filed: Aug. 27, 2020

(65) Prior Publication Data
US 2022/0070987 A1    Mar. 3, 2022

(51) Int. Cl.
    *H05B 47/10* (2020.01)
    *H05B 47/125* (2020.01)
    *G06T 5/50* (2006.01)

(52) U.S. Cl.
    CPC ............ *H05B 47/125* (2020.01); *G06T 5/50* (2013.01)

(58) Field of Classification Search
    CPC .. H05B 47/105; H05B 47/115; H05B 47/125; H05B 47/185; H05B 47/195
    See application file for complete search history.

(56) References Cited

U.S. PATENT DOCUMENTS

| | | | | |
|---|---|---|---|---|
| 8,779,667 B2* | 7/2014 | Nanahara | ............. | H05B 47/125 |
| | | | | 315/151 |
| 10,165,650 B1* | 12/2018 | Fini | ........................ | H05B 47/10 |
| 10,306,738 B2* | 5/2019 | Roberts | .................. | H05B 47/11 |
| 2007/0035706 A1* | 2/2007 | Margulis | ............. | H04N 9/3102 |
| | | | | 353/122 |
| 2012/0319596 A1* | 12/2012 | Nanahara | ............. | H05B 47/125 |
| | | | | 315/153 |
| 2016/0205749 A1* | 7/2016 | Creusen | .................. | H05B 47/18 |
| | | | | 315/151 |
| 2017/0127492 A1* | 5/2017 | Underwood | ........... | H05B 47/11 |
| 2019/0108643 A1* | 4/2019 | Wang | ..................... | F16M 13/04 |

* cited by examiner

*Primary Examiner* — Tung X Le
(74) *Attorney, Agent, or Firm* — Winston Hsu

(57) ABSTRACT

A method of controlling a lighting fixture based on motion detection includes: receiving a plurality of captured image frames; obtaining a plurality of resampled image frames by resampling the captured image frames according to regional characteristics of the resampled image frames; dynamically adjusting a sensitivity for motion detection according to the regional characteristics of the resampled image frames; performing motion detection on the resampled image frames according to the sensitivity; and controlling the lighting fixture according to a result of the motion detection.

15 Claims, 7 Drawing Sheets

METHOD AND APPARATUS FOR CONTROLLING A LIGHTING FIXTURE BASED ON MOTION DETECTION AND RELATED LIGHTING FIXTURE

BACKGROUND OF THE INVENTION

1. Field of the Invention

The present invention relates to motion detection, and more particularly to, a method and apparatus for controlling a lighting fixture based on motion detection and related lighting fixture.

2. Description of the Prior Art

Lighting fixtures with motion sensors can be used as automatic light sources in a variety of indoor/outdoor environments, such as passageways, streets and parking lots, which are pretty energy-efficient because they are only activated upon motion of a person or a living body.

Typically, a motion sensor uses image sensors with wide-angle lens or fish-eye lens to capture a scene and detect the motion therein. The wide-angle lens or fish-eye lens usually has a field of view over 100 degrees, thereby provides a decent coverage for the scene. However, by nature of the wide-angle lens or fish-eye lens, there will be a variety of imperfections, such as optical distortion (e.g. barrel distortion) and lens shading, introduced to the images generated by the image sensors.

On the other hand, scene illuminated by a light source may have lighting non-uniformity in the form of roll-off from center to corner. As the image sensor of the motion sensor is placed close to the light source, captured image frames may observe such lighting non-uniformity, which could degrade accuracy of motion detection on edges and corners of the captured image frames.

In view of above, without proper correction or compensation, it will be difficult to have an accurate motion analysis or detection on the images obtained by the image sensors with wide-angle lens or fish-eye lens. Therefore, there is a need for providing methods for alleviating influences caused by optical distortion, lens shading and lighting non-uniformity.

SUMMARY OF THE INVENTION

With this in mind, it is one object of the present invention to provide a method and apparatus for controlling lighting fixtures in automatic lighting applications. The present invention features an image resampling process with a variable sampling rate, where the variable sampling rate can be used to preserve more details and information around edges and corners of the captured image frames when transforming the captured image frames to resampled image frames, which is useful in alleviating the optical distortion. In addition, the present invention also features a dynamic adjustment on sensitivity for motion detection, which can improve the accuracy of motion detection for edges and corners of the captured image frames by compensating lighting non-uniformity and/or lens shading. In view of above, the present invention effectively improves performance of motion detection with wide field of view camera.

According to one embodiment, a method of controlling a lighting fixture based on motion detection is provided. The method comprises: receiving a plurality of captured image frames; obtaining a plurality of resampled image frames by resampling the captured image frames according to regional characteristics of the resampled image frames; dynamically adjusting a sensitivity for motion detection according to the regional characteristics of the resampled image frames; performing motion detection on the resampled image frames according to the sensitivity; and controlling the lighting fixture according to a result of the motion detection.

According to one embodiment, an apparatus of controlling a lighting fixture based on motion detection is provided. The apparatus comprises: an image resampling unit, a motion detection unit and a lighting control unit. The image resampling unit is arranged to receive a plurality of captured image frames and obtain a plurality of resampled image frames by resampling the captured image frames according to regional characteristics of the resampled image frames. The motion detection unit is coupled to the image resampling unit and arranged to dynamically adjust a sensitivity for motion detection according to the regional characteristics of the resampled image frames and perform motion detection on the resampled image frames according to the sensitivity. The lighting control unit is coupled to the motion detection unit and arranged to control the lighting fixture according to a result of the motion detection.

According to one embodiment, a lighting fixture controlled based on motion detection is provided. The lighting fixture comprises: a light source, an image resampling unit, a motion detection unit and a lighting control unit. The image resampling unit is arranged to receive a plurality of captured image frames and obtain a plurality of resampled image frames by resampling the captured image frames according to regional characteristics of the resampled image frames. The motion detection unit is coupled to the image resampling unit and arranged to dynamically adjust a sensitivity for motion detection according to the regional characteristics of the resampled image frames and perform motion detection on the resampled image frames according to the sensitivity. The lighting control unit is coupled to the motion detection unit and arranged to control brightness of the light source according to a result of the motion detection.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

The present invention provides a lighting fixture that is controlled by results of motion detection. Typically, brightness of the lighting fixture (i.e., light source) can be controlled as follows. When there is no motion or presence of any object detected, a brightness of the lighting fixture is kept at low level in order to save energy. Once the motion or presence of one or more objects is detected, a notification can be sent to a lighting control circuit of the lighting fixture. Accordingly, the lighting control circuit increases power for driving the lighting source in the lighting fixture, and thus the brightness of the lighting source increases from the low level to a high level. Once the object is absent, a notification will be sent to the lighting control circuit. The lighting control circuit decreases the brightness of the lighting fixture from the high level to the low level.

Figure 1:
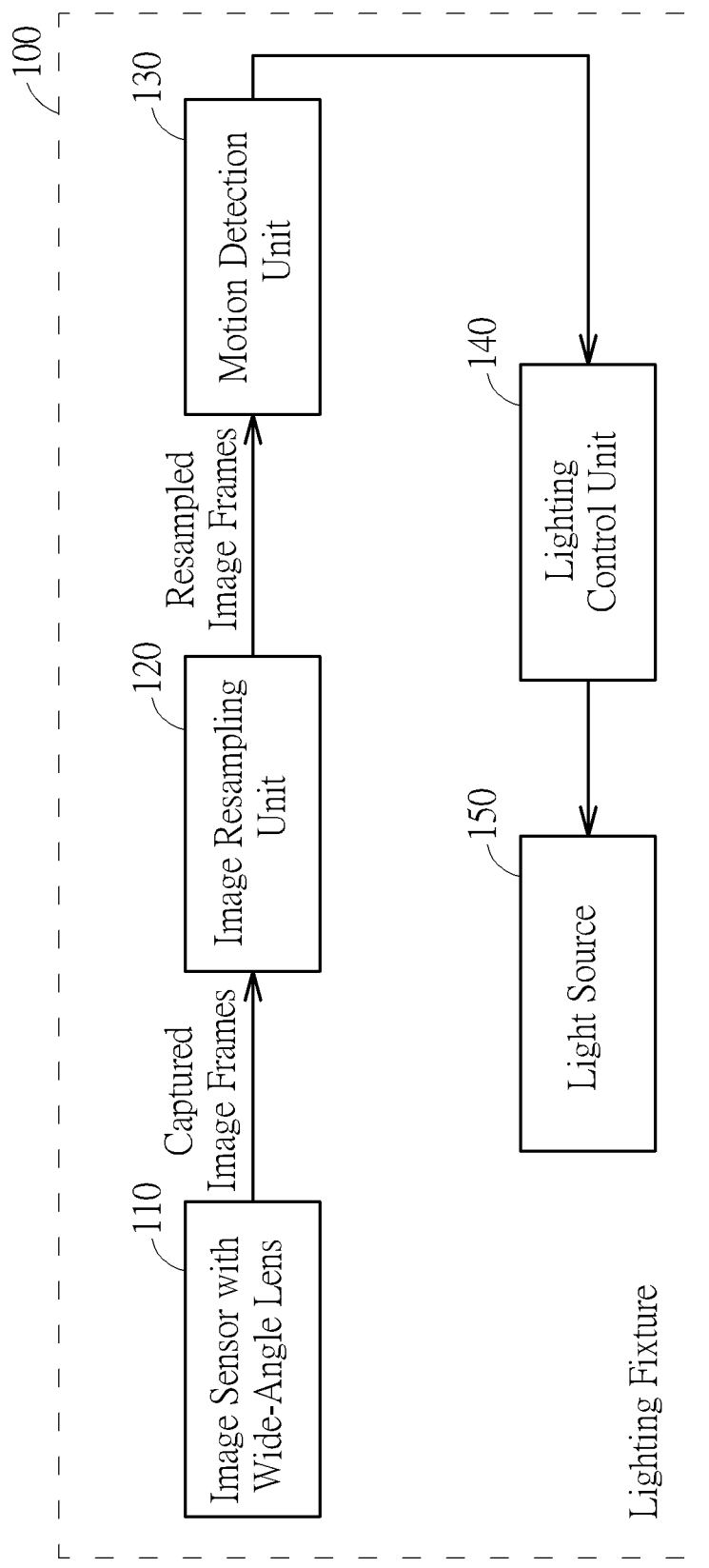
FIG. 1 illustrates a block diagram of a lighting fixture controlled based on motion detection according to one embodiment of the present invention.

FIG. 1 illustrates a lighting fixture according to one embodiment of the present invention. As illustrated, a lighting fixture 100 comprises an image sensor with wide-angle lens 110, an image resampling unit 120, a motion detection unit 130, a lighting control unit 140 and a light source 150. Wide-angle lens could have a field of view larger than 110 degrees. According to various embodiments, the image resampling unit 120 and the motion detection unit 130 may be integrated in a single chip or separated in discrete chips. Alternatively, the image resampling unit 120 and the motion detection unit 130 may be implemented by a processor executing program codes.

Figure 2:
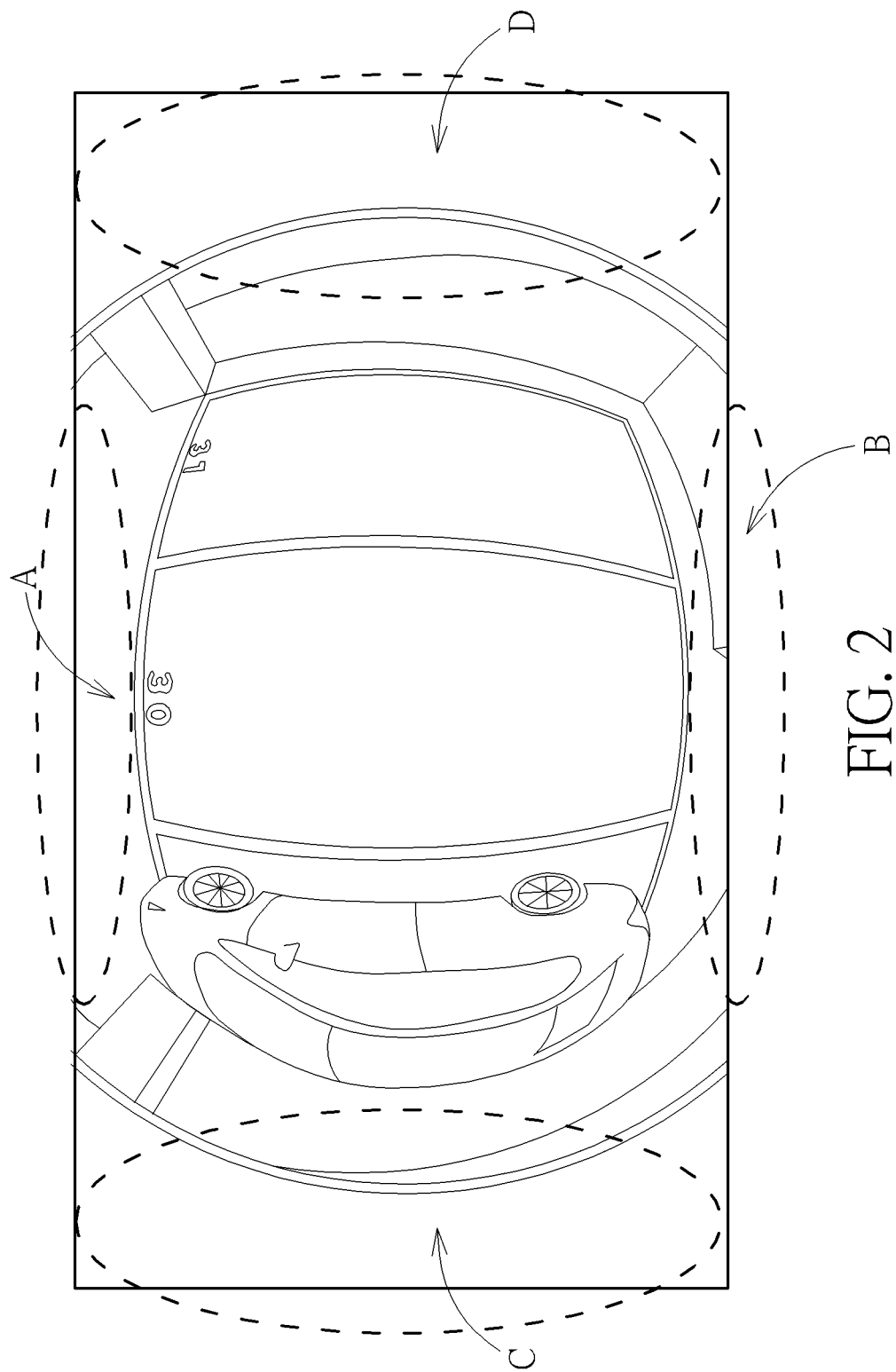
FIG. 2 illustrates how to determine a region-of-interest of a captured image frame according to one embodiment of the present invention.

The image sensor with wide-angle lens 110 is arranged to capture consecutive image frames of a scene, where the scene could be passageways, streets, indoor/outdoor parking lots, or the like. The image resampling unit 120 is arranged to generate a plurality of resampled image frames corresponding the captured image frames provided by the image sensor 110, which mainly sampling pixels in the captured image frames with a variable sampling rate to generate the resampled image frames. In one embodiment, the image resampling unit 120 could further determine a region of interest (ROI) in the captured image frames before resampling, which allows certain information outside the determined ROI to be ignored in a following motion detection process. Please refer to FIG. 2 for further details.

As illustrated, the image resampling unit 120 may remove areas A, B, C and D in determining the ROI of a captured image frame. Specifically, the image resampling unit 120 removes areas A and B from the captured image frame since areas A and B correspond to parts of the scene that are never or barely illuminated by the light source 150. Thus, it is meaningless to detect motion or presence of an object in the areas A and B. Moreover, the image resampling unit 120 may remove areas C and D from the captured image frame since the areas C and D correspond to parts of the scene whose height is higher than a predetermined level. For example, as the areas C and D correspond to the ceiling and the top space of the parking lot, it is meaningless to activate the light source 140 when detecting motion or presence of an object in the areas C and D because no human being will exist in those areas. In view of above, the image resampling unit 120 may remove some areas from the captured image frames since it is not necessary to detect motion in those areas before proceeding to generating resampled image frames.

Figure 3:
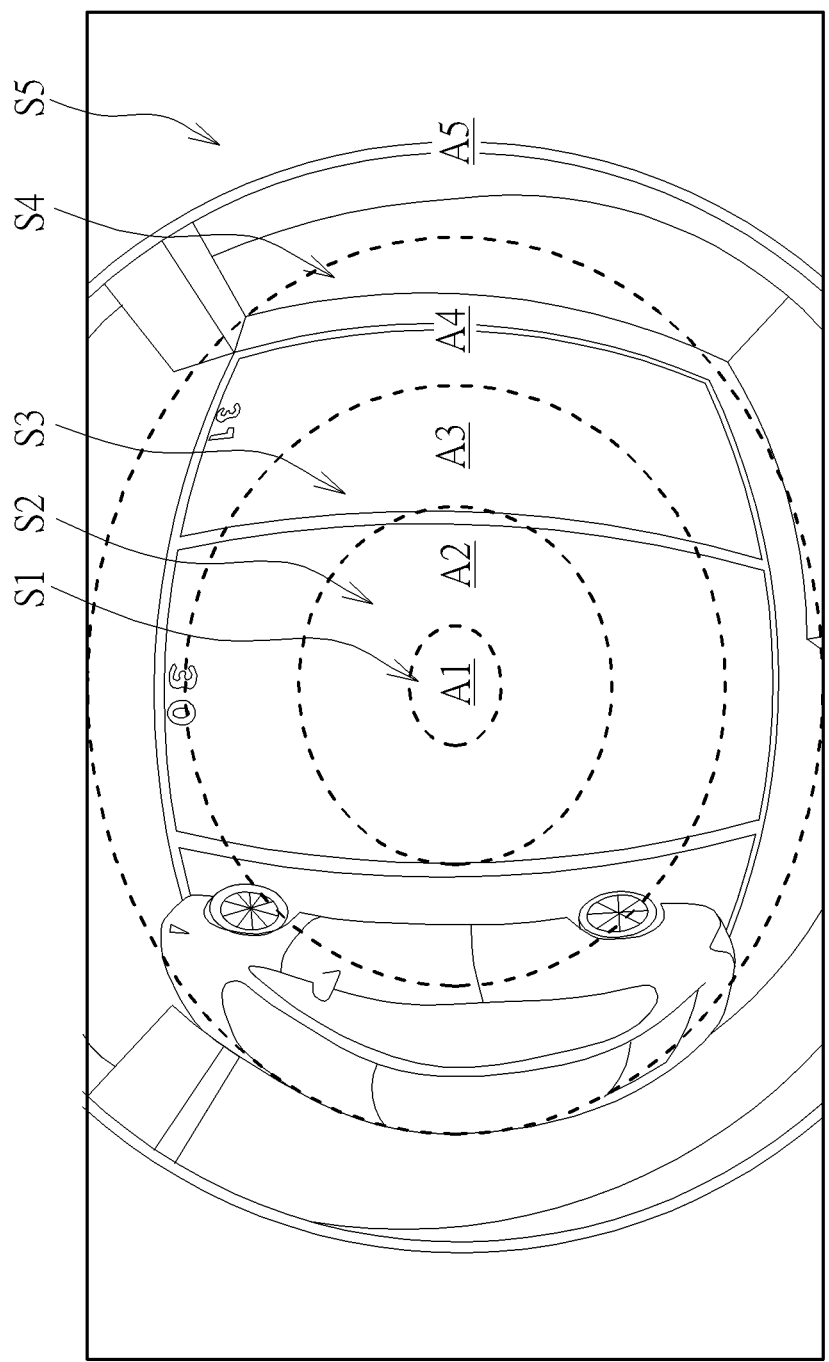
FIG. 3 illustrates a distribution of sampling rates for different areas in a captured image frame according to one embodiment of the present invention.

Once the ROI of the captured image frames is determined, the image resampling unit 120 will sample the pixels in the ROI of the captured image frames with a variable sampling rate. Specifically, a sampling rate represents how many pixels in a unit area of the captured image frame will be sampled as sampled points (i.e., pixels) of the resampled image frame. The image resampling unit 120 determines the sampling rate for each area in the ROI according to locations of the areas relative to a center of the captured image frames. In embodiments of the present invention, a sampling rate for a relatively outer area of the captured image frame will be higher than a sampling rate for a relatively inner area of the captured image frame. Please refer to FIG. 3, which shows a distribution of sampling rates over a captured image frame. As illustrated, a sampling rate S5 for area A5 has the largest value of the sampling rates S1-S5, while a sampling rate S1 for area A1 has the smallest value of the sampling rates S1-S5. This means the image resampling unit 120 will sample more pixels in the outer area (e.g. A5, A4) and sample fewer pixels in the inner area (e.g. A2, A1). As the sampling rate for pixels in outer areas are higher, more details/information in the outer areas of the captured image frame can be therefore reserved for the following motion detection process. Such resampling process can enlarge a size of an object in corners and edges of the captured image frames and accordingly improve the accuracy of motion detection in that area, such that the optical distortion can be compensated.

Please note that the image resampling unit 120 may not determine the ROI in the captured image frames before resampling the captured image frame in some embodiments. In these embodiments, the image resampling unit 120 will not remove areas outside the ROI from the captured image frames. Therefore, all the information in the captured image frames will be preserved for the following motion detection process.

Figure 4:
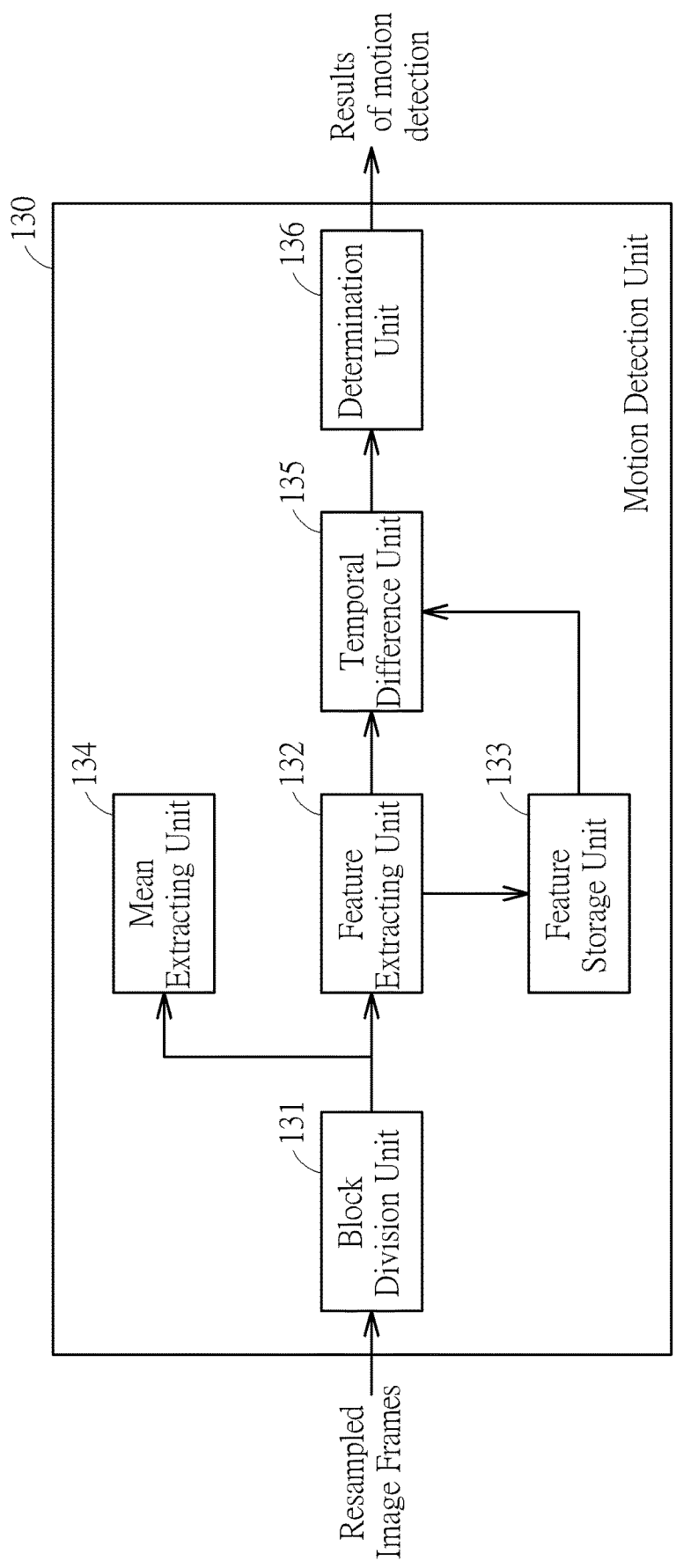
FIG. 4 illustrates a block diagram of a motion detection unit according to one embodiment of the present invention.

The motion detection unit 130 is arranged to perform the motion detection on the resampled image frames provided by the image resampling unit 120. FIG. 4 illustrates a block diagram of a motion detection unit according to one embodiment of the present invention. As illustrated, the motion detection unit 130 comprises a block division unit 131, a feature extracting unit 132, a feature storage unit 133, a mean extracting unit 134, a temporal difference unit 135 and a determination unit 136.

Figure 5:
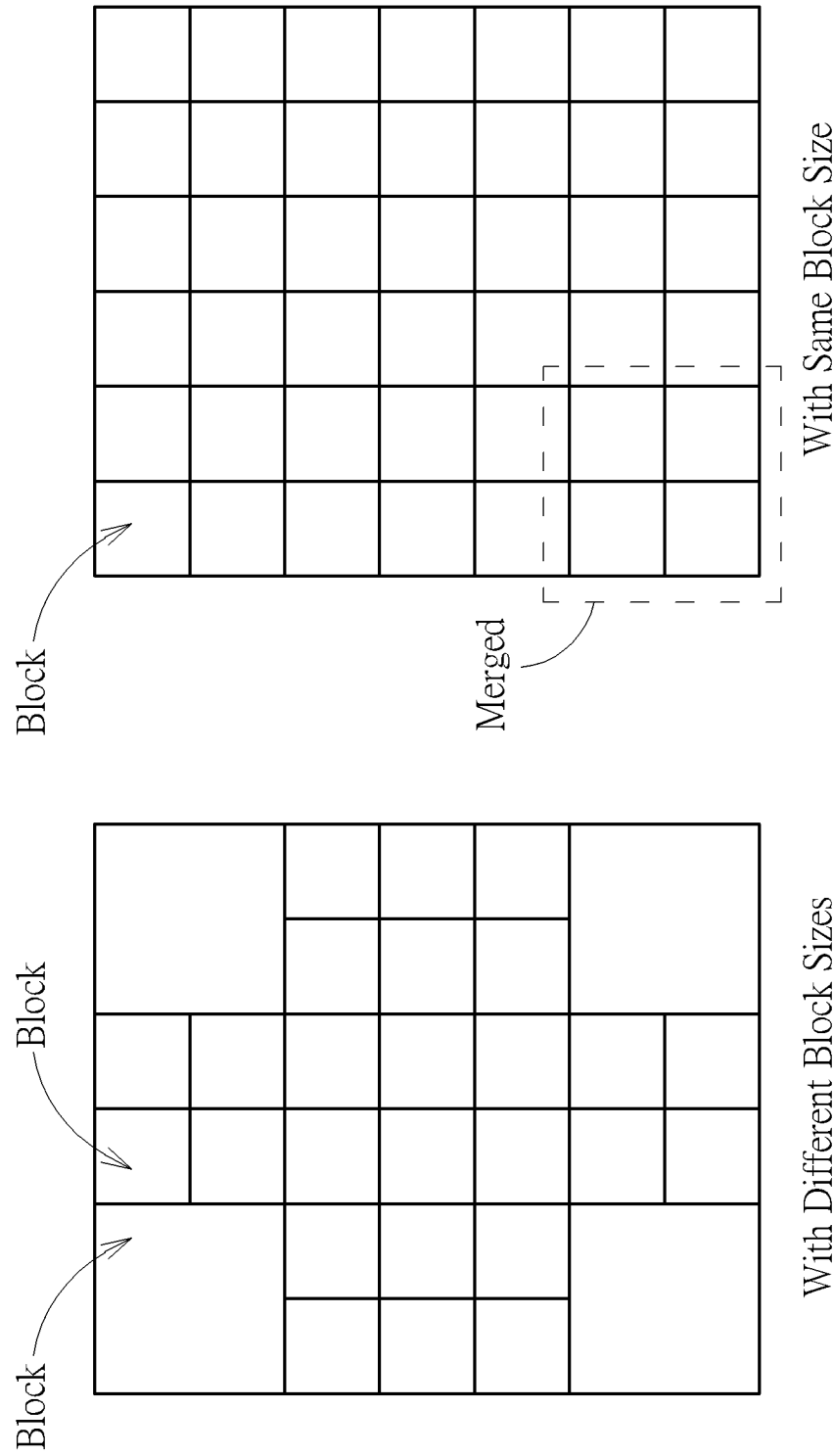
FIG. 5 illustrates how to divide a resampled image frame into blocks according to one embodiment of the present invention.

The block division unit 131 is arranged to divide each of the resampled image frames into multiple blocks as illustrated by the FIG. 5. In order to improve noise immunity, the block division unit 131 may have images divided into blocks of different sizes in some embodiments of the present invention. For example, blocks around corners of the resampled image frame having relatively large sizes. Since blocks around corners of the resampled image frame may have lower brightness due to lighting non-uniformity and lens shading, it will be favorable to having more pixels in blocks around corners to improve signal to noise ratio of these blocks. In another embodiment, the block division unit 131 may firstly divide the resampled image frame into blocks with a same block size. Once it is found that certain blocks having lower brightness, these blocks can be merged into a larger one, thereby to improve signal to noise ratio of these blocks.

The feature extracting unit 132 is arranged to determine a block feature value for each block of a resampled image frame. In one embodiment, the block feature value could be identical to a mean value of brightness of pixels in a block. Alternatively, each block could be processed by an edge detector, such as Sobel filter, and an output of Sobel filter could be served as the block feature value. The feature storage unit 133 is arranged to store block feature values of the blocks in a previous resampled image frame that are calculated by the feature extracting unit 132. The mean extracting unit 134 is arranged to determine a block mean value for each block in a resampled image frame, where the block mean value is a mean value of brightness of pixels in a block. The temporal difference unit 135 is arranged to compute block feature differences between block feature values of a current resampled image frame that are calculated by the feature extracting unit 132 and block feature values of a previous resampled image frame that are stored in the feature storage unit 133. The block feature differences calculated by the temporal difference unit 135 will indicate how features of a block changes over a period of time. The determination unit 136 is arranged to compare the block feature differences calculated by the temporal difference unit 135 with a dynamic threshold value that corresponding to each block, thereby to determine whether a block is a motion block or not. Typically, if a block feature difference corresponding to a block is larger than the dynamic threshold value corresponding to the block, the determination unit 136 determines the block is a motion block. If not, the determination unit 136 determines the block is a still block. Accordingly, the determination unit 136 will determine motion or presence of the object exists if one or more blocks in the resampled image frame are determined as motion blocks In one embodiment, the determination unit 136 determines the dynamic threshold value block by block in accordance with a first threshold value T1 and a second threshold value T2, where the first threshold value T1 for a block is determined based on a block mean value of the block and the second threshold value T2 for a block is determined based on a distance of the block relative to a center of the resampled image frame. Please refer to FIGS. 6A and 6B, where FIG. 6A illustrates possible relationships between the first threshold value T1 and the block mean value of a block, while FIG. 6B illustrates possible relationships between the second threshold value T2 and the distance of the block relative to the image center.

Figure 6A:
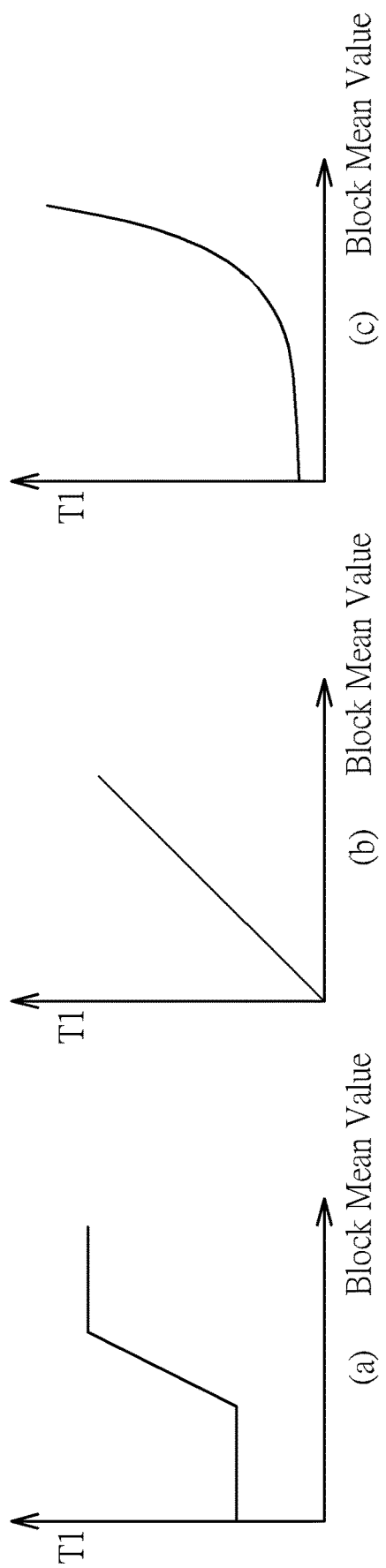
FIG. 6A illustrates possible relationships between a first threshold value T1 and a block mean value.

As illustrated in FIG. 6A, the first threshold value T1 will increase as the block mean value increases. This means the first threshold value T1 will be relatively low for darker blocks and relatively high for brighter blocks. In other words, the motion detection algorithm of the present invention is more sensitive to dark areas of the resampled image frame, and less sensitive to bright areas of the resampled image frame. Increasing sensitivity for dark areas is intended for compensating lighting non-uniformity and lens shading issues since the low brightness of the dark areas may be caused by lighting non-uniformity and lens shading.

Figure 6B:
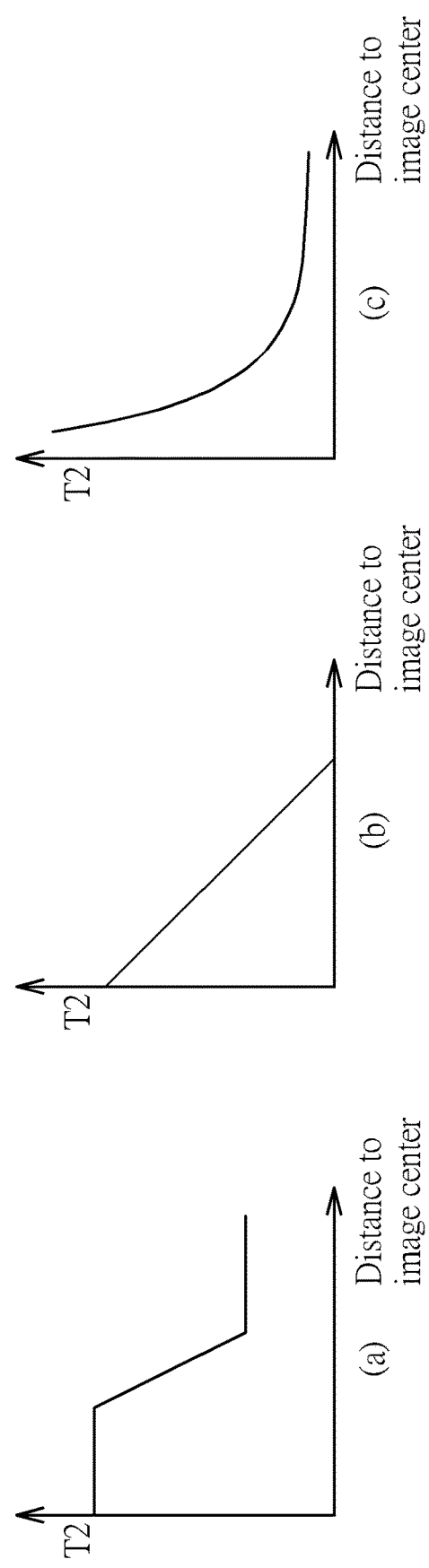
FIG. 6B illustrates possible relationships between a second threshold value T2 and a distance of the block relative to the image center.

As can be seen from FIG. 6B, the second threshold value T2 will decrease as the position of the block moves away from the center of the resampled image frame. This means the second threshold value T2 will be relatively low for blocks adjacent to corners and edges of the resampled image frame, while the second threshold value T2 will be relatively high for blocks adjacent to the center of the resampled image frame. That is, the motion detection algorithm of the present invention is more sensitive to edges and corners of the resampled image frame, and less sensitive to center parts of the resampled image frame. This is intended for compensating lighting non-uniformity or lens shading issues since edges and corners of the resampled image frame are severely influenced by the lighting non-uniformity or lens shading issues. By increasing the sensitivity to corners and edges of the resample image frame, the accuracy of the motion detection can be improved.

Once the first threshold value T1 and the second threshold value T2 have been determined, the determination unit 136 determines the dynamic threshold value according to a maximum of the first threshold value T1 and the second threshold value T2. That is, a larger one of the first threshold value T1 and the second threshold value T2 will be selected as the dynamic threshold value. Accordingly, the determination unit 136 determines whether a block is motion or still according to the block feature difference and the dynamic threshold value corresponding to the block.

Figure 7:
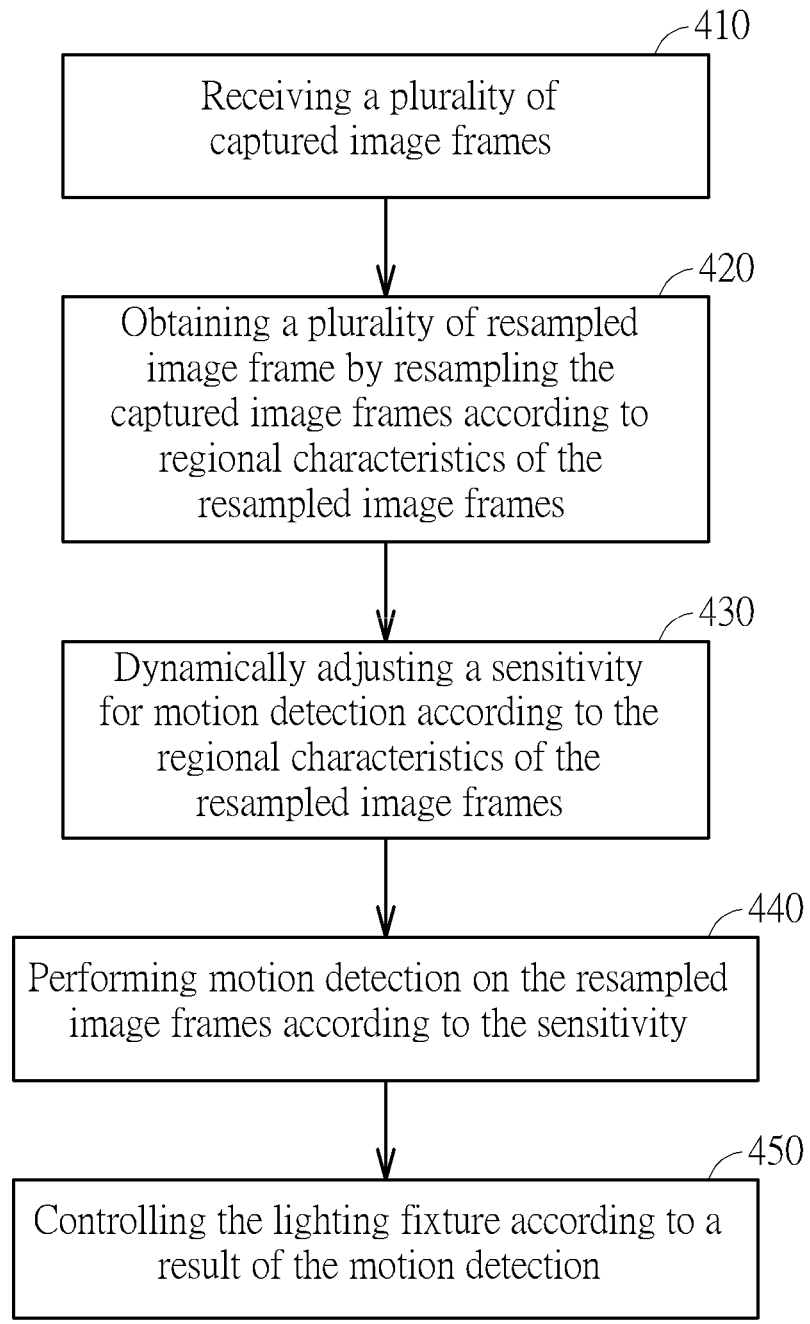
FIG. 7 illustrates a flow chart of controlling a lighting fixture based on motion detection according to one embodiment of the present invention.

FIG. 7 illustrates a simplified flow chart of the method according to one embodiment of the present invention. The flow comprises the following step:

Step 410: receiving a plurality of captured image frames;

Step 420: obtaining a plurality of resampled image frames by resampling the captured image frames according to regional characteristics of the resampled image frames;

Step 430: dynamically adjusting a sensitivity for motion detection according to the regional characteristics of the resampled image frames;

Step 440: performing motion detection on the resampled image frames according to the sensitivity; and Step 450: controlling the lighting fixture according to a result of the motion detection.

As details of the above-mentioned steps have been explained in the embodiments, further descriptions are omitted here for the sake of brevity. Please note that there could be some other steps could be combined into or executed with the above-identified steps in order to improve the accuracy of the motion detection in various aspects.

In conclusion, the present invention provides decent methods and apparatus for indoor/outdoor automatic lighting applications. The present invention features an image resampling process with a variable sampling rate, where the variable sampling rate can be used to preserve more details and information around edges and corners of the captured image frames when transforming the captured image frames to resampled image frames, which is useful in alleviating the optical distortion. In addition, the present invention also features a dynamic adjustment on sensitivity for motion detection, which can improve the accuracy of motion detection for edges and corners of the captured image frames by compensating issues such as lighting non-uniformity and lens shading. In view of above, the present invention effectively improves performance of motion detection with wide field of view camera.

Embodiments in accordance with the present invention can be implemented as apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a lighting fixture based on motion detection, comprising:
   receiving a plurality of captured image frames;
   determining a region of interest (ROI) in each of the captured image frames, wherein the step of determining the ROI in each of the captured image frames comprises:
      removing an area from each of the captured image frames, where the area corresponds to a part of a scene that is not illuminated by the lighting fixture;
   obtaining a plurality of resampled image frames by resampling the captured image frames according to regional characteristics of the resampled image frames, wherein the step of obtaining the resampled image frames comprises:
      resampling the ROI in each of the capture image frames to obtain the resampled image frames;
   dynamically adjusting a sensitivity for motion detection according to the regional characteristics of the resampled image frames;
   performing motion detection on the resampled image frames according to the sensitivity; and
   controlling the lighting fixture according to a result of the motion detection.

2. The method of claim 1, wherein the step of obtaining the resampled image frames comprising:
   for each of the captured image frames:
      determining multiple different sampling rates for different areas of the capture image frame; and
      sampling pixels in each area of the captured image frame with a corresponding sampling rate to obtain a resampled image frame;
      wherein a sampling rate for an outer area of the capture image frame is higher than a sampling rate for an inner area of the capture image frame.

3. The method of claim 1, wherein the step of determining the ROI in each of the captured image frames comprises:
   removing an area from each of the captured image frames, where the area corresponds to a part of a scene whose height is higher than a predetermined level.

4. The method of claim 1, wherein the step of performing motion detection comprises:
   dividing each of the resampled image frames into multiple blocks; and
   performing motion detection according to block feature values of the blocks of the resampled image frames.

5. The method of claim 4, wherein the step of dynamically adjusting the sensitivity for motion detection comprises:
   determining a dynamic threshold value for each block of a resampled image frame according to a maximum of a first threshold value and a second threshold value;
   determining the first threshold value according to a block mean value that is obtained by averaging brightness values of pixels in the block;
   determining the second threshold value according to a distance of the block relative to a center of the resampled image frame; and
   the step of performing motion detection comprising:
      determining whether motion exists according to the dynamic threshold value.

6. The method of claim 4, wherein the step of dividing each of the resampled image frames comprises:
   dividing each of the resampled image frames into multiple blocks with different block sizes.

7. The method of claim 4, wherein the step of performing motion detection comprises:
   dividing each of the resampled image frames into multiple blocks with a fixed block size;
   selectively merging more than one blocks into a merged block; and
   determining a block feature value for each of non-merged and merged blocks.

8. An apparatus of controlling a lighting fixture based on motion detection, comprising:
   an image resampling unit, arranged to receive a plurality of captured image frames and obtain a plurality of resampled image frame by resampling the captured image frames according to regional characteristics of the resampled image frames, wherein the image resampling unit is further arranged to determine a region of interest (ROI) in each of the captured image frames and resample the ROI in each of the captured image frames to obtain the resampled image frames; and the image resampling unit removes an area from each of the captured image frames when determining the ROI, where the area corresponds to a part of a scene that is not illuminated by the lighting fixture;

a motion detection unit, coupled to the image resampling unit, arranged to dynamically adjust a sensitivity for motion detection according to the regional characteristics of the resampled image frames and perform motion detection on the resampled image frames according to the sensitivity; and a lighting control unit is coupled to the motion detection unit and arranged to control the lighting fixture according to a result of the motion detection.

9. The apparatus of claim 8, wherein for each of the captured image frames, the image resampling unit is arranged to:

determine multiple different sampling rates for different areas of the capture image frame; and sample pixels in each area of the captured image frame with a corresponding sampling rate to obtain a resampled image frame;

wherein a sampling rate for an outer area of the capture image frame is higher than a sampling rate for an inner area of the capture image frame.

10. The apparatus of claim 8, wherein the image resampling unit is arranged to remove an area from each of the captured image frames, where the area corresponds to a part of a scene whose height is higher than a predetermined level.

11. The apparatus of claim 8, wherein the motion detection unit is arranged to divide each of the resampled image frames into multiple blocks and perform motion detection according to block feature values of the blocks of the resampled image frames.

12. The apparatus of claim 11, wherein the motion detection unit is arranged to determine a dynamic threshold value for each block of a resampled image frame according to a maximum of a first threshold value and a second threshold value, determine the first threshold value according to a block mean value that is obtained by averaging brightness values of pixels in the block and determine the second threshold value according to a distance of the block relative to a center of the resampled image frame; and the motion detection unit is further arranged to determine whether motion exists according to the dynamic threshold value.

13. The apparatus of claim 11, wherein the motion detection unit is arranged to divide each of the resampled image frames into multiple blocks with different block sizes.

14. The apparatus of claim 11, wherein the motion detection unit is arranged to divide each of the resampled image frames into multiple blocks with a same block size, selectively merge more than one blocks into a merged block, and determine a block feature value for each of non-merged and merged blocks.

15. A lighting fixture controlled based on motion detection, comprising:

a light source;

an image resampling unit, arranged to receive a plurality of captured image frames and obtain a plurality of resampled image frames by resampling the captured image frames according to regional characteristics of the resampled image frames, wherein the image resampling unit is further arranged to determine a region of interest (ROI) in each of the captured image frames and resample the ROI in each of the captured image frames to obtain the resampled image frames; and the image resampling unit removes an area from each of the captured image frames when determining the ROI, where the area corresponds to a part of a scene that is not illuminated by the lighting fixture;

a motion detection unit, coupled to the image resampling unit, arranged to dynamically adjust a sensitivity for motion detection according to the regional characteristics of the resampled image frames and perform motion detection on the resampled image frames according to the sensitivity; and a lighting control unit is coupled to the motion detection unit and arranged to control brightness of the light source according to a result of the motion detection.

* * * * *